Figure 1:
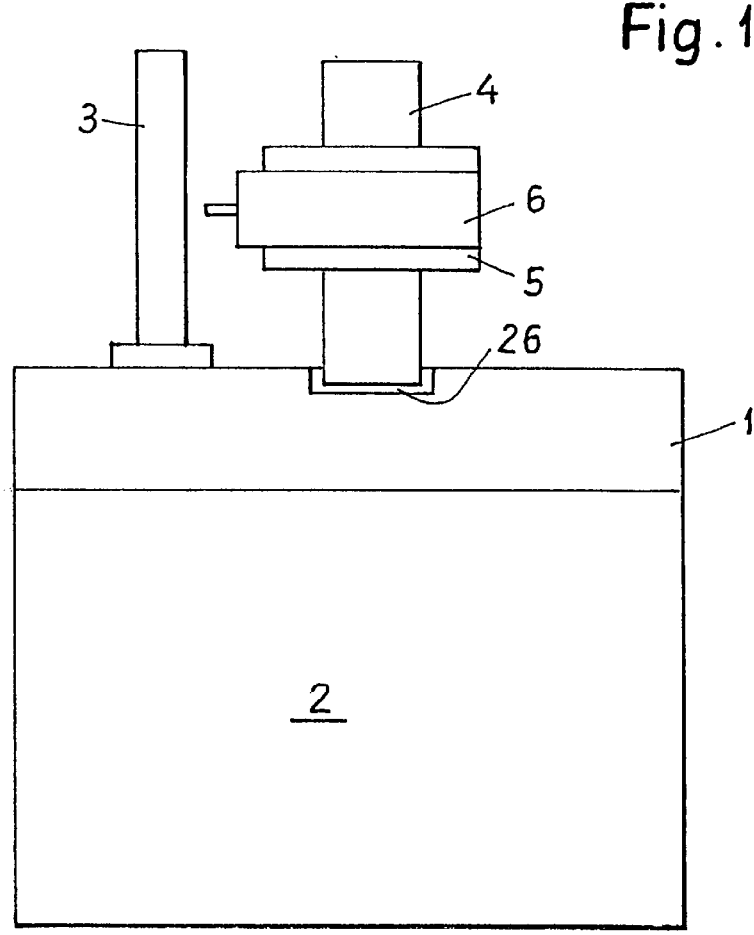

United States Patent [19]
Huber

[11] Patent Number: 6,113,324
[45] Date of Patent: Sep. 5, 2000

[54] WORKPIECE MACHINING DEVICE

[75] Inventor: Eduard Huber, Neuhausen am Rheinfall, Switzerland

[73] Assignee: Huber Engineering AG, Hergiswil, Switzerland

[21] Appl. No.: 09/077,763

[22] PCT Filed: Nov. 18, 1997

[86] PCT No.: PCT/CH97/00437

§ 371 Date: Sep. 4, 1998

§ 102(e) Date: Sep. 4, 1998

[87] PCT Pub. No.: WO99/25517

PCT Pub. Date: May 27, 1999

[51] Int. Cl.[7] ............... B23Q 1/01; B23B 17/00
[52] U.S. Cl. .................. 409/235; 29/DIG. 101; 82/149; 408/234
[58] Field of Search .................. 409/235, 286; 483/14, 15; 408/234; 82/149, 142, 153, 117; 451/243, 11; 248/679, 680; 29/DIG. 101

[56] References Cited

U.S. PATENT DOCUMENTS

| | | | |
|---|---|---|---|
| 3,623,274 | 11/1971 | Voumard | 409/235 UX |
| 3,800,636 | 4/1974 | Zagar | 408/234 |
| 4,622,194 | 11/1986 | Rogers et al. | 409/235 X |
| 4,826,127 | 5/1989 | Koblischek et al. | 409/235 X |
| 5,183,374 | 2/1993 | Line | 409/286 |
| 5,213,019 | 5/1993 | Carlyle et al. | 82/142 |
| 5,277,395 | 1/1994 | Smith et al. | 248/679 |
| 5,325,750 | 7/1994 | Carlyle et al. | 82/149 |
| 5,439,431 | 8/1995 | Hessbruggen et al. | 483/14 |
| 5,573,451 | 11/1996 | Tschudin | 451/243 |
| 5,730,643 | 3/1998 | Bartlett et al. | 451/11 X |
| 5,910,201 | 6/1999 | Muscarella et al. | 82/153 X |

FOREIGN PATENT DOCUMENTS

| | | |
|---|---|---|
| 0420735 | 4/1991 | European Pat. Off. . |
| 0631840 | 1/1995 | European Pat. Off. . |
| 2402039 | 3/1979 | France . |
| 1937300 | 2/1970 | Germany . |
| 3734895 | 6/1988 | Germany . |
| 3925908 | 2/1991 | Germany . |

*Primary Examiner*—William Briggs
*Attorney, Agent, or Firm*—Brown & Wood, LLP

[57] ABSTRACT

The apparatus contains a plate (1) which serves as a connecting element between a lower part (2) and also a working table (3) and a tool support (4). In this way a design concept can be realised which enables the manufacture of the apparatus in the form of a modular constructions series.

8 Claims, 3 Drawing Sheets

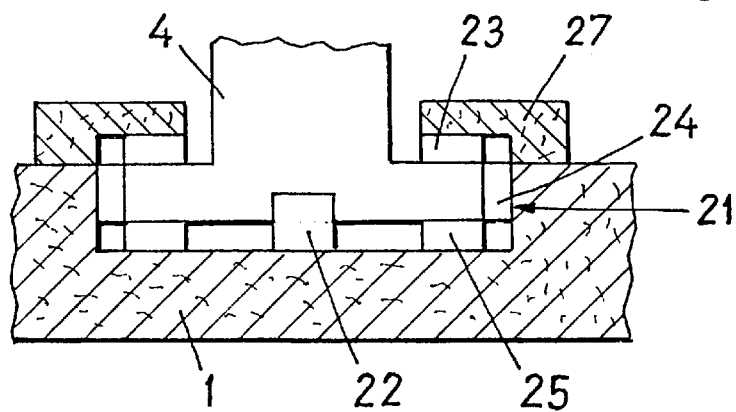
Fig. 4
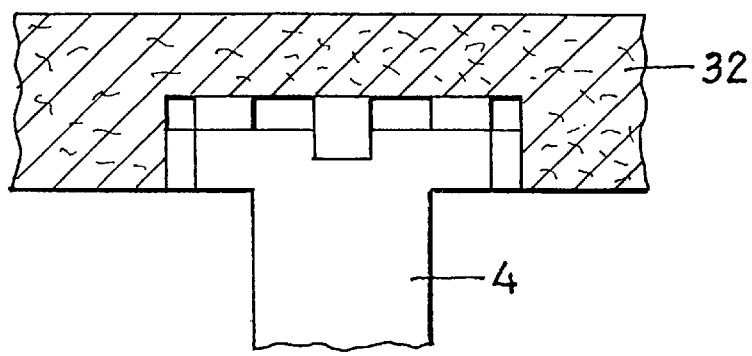
Fig. 6
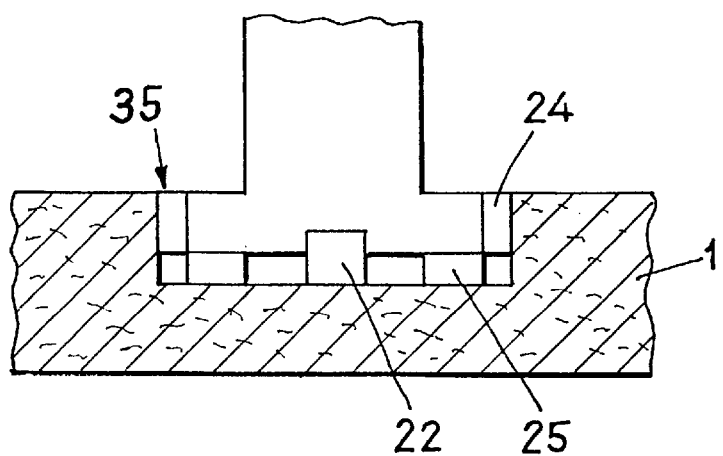

WORKPIECE MACHINING DEVICE

The invention relates to an apparatus for the machining of workpieces in accordance with the preamble of claim 1.

An apparatus is described in EP-A-O 652 075 which has a frame, a working table and a tool support which is formed as a portal. The portal in the working table comprises a non-metal. The portal is mounted on the working table.

The invention, as characterised in the claims, is based on the object of improving the named apparatus.

Through the use of the plate as a connection element between the lower part and the working table and also the tool support, a design concept is obtained which enables the manufacture of the apparatus in the form of modular series. Associated with this is a simple construction and a cost-favourable manufacture. Furthermore, so-called low-cost apparatuses and high-tech apparatuses can be realised with this concept. With the design of the lower part, the plate, the working table and the machine tool of non-metal, in particular of natural stone, the influence of thermal expansion and of the oscillations during the machining of a workpiece are largely overcome.

In the following the invention will be explained with respect to the accompanying drawing.

Figure 2:
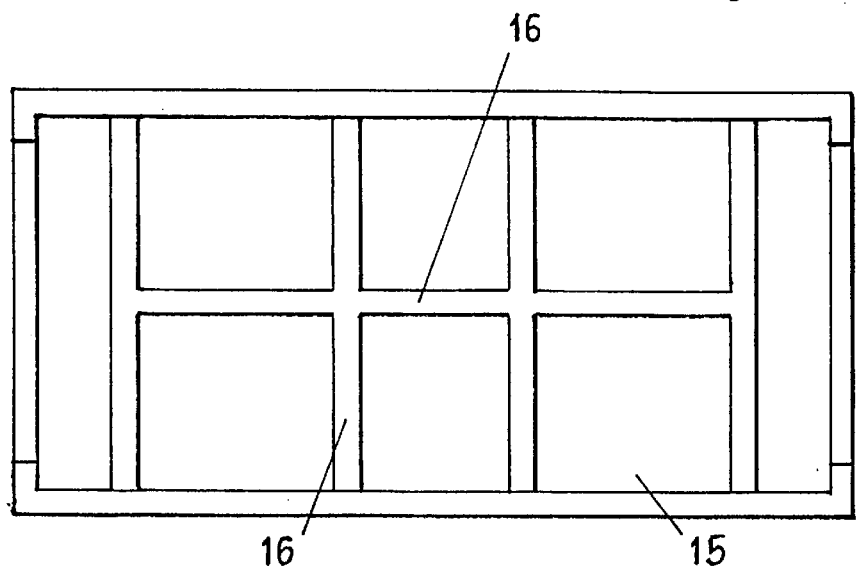
Figure 3:
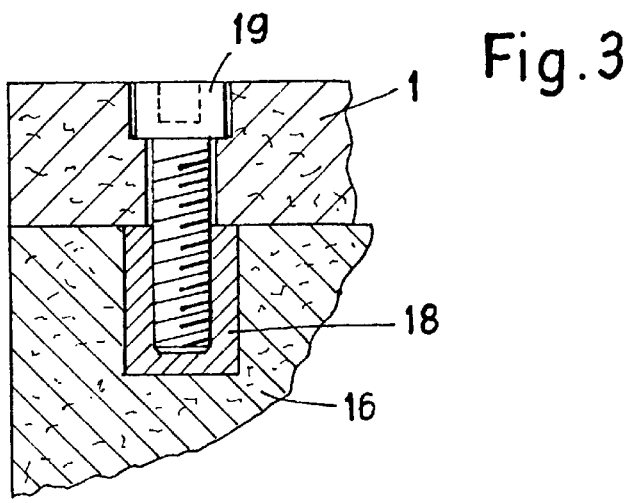
Figure 5:
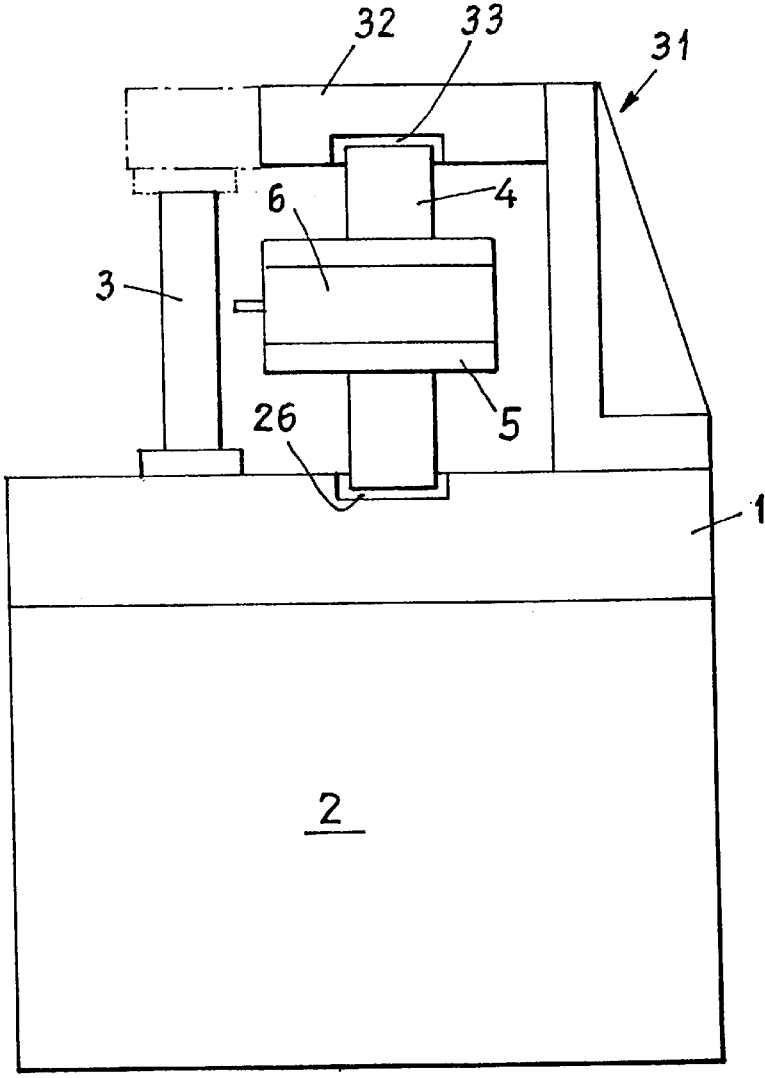

There are shown:

FIG. 1 a side view of a first embodiment of an apparatus in accordance with the invention;

FIG. 2 a plan view of an embodiment of a lower part;

FIG. 3 a section of an embodiment of a lower part;

FIG. 4 a view of a first embodiment of a bearing arrangement for the tool support;

FIG. 5 a side view of a second embodiment of an apparatus in accordance with the invention; and FIG. 6 a view of a second embodiment of a bearing arrangement for the tool support.

Reference is made to the FIGS. 1 to 4. In the apparatus under discussion here, a plate 1 is arranged between a lower part 2 and also a working table 3 and a tool support 4. The plate 1, the lower part 2, the working table 3 and the tool support 4 consist of natural stone, in particular of granite. A carriage 5 is arranged on the tool suppport 4, the Z-axis is displaceable and provided with a machining device 6 which is displaceable in the Y-axis.

The lower part 2 comprises a base plate 15 and a plurality of wall parts 16 which are fixedly connected to the base plate, for example adhesively bonded thereto. The geometrical arrangement of the wall parts is, on the one hand, determined by the space requirement of control and service devices and, on the other hand, by the requirement for a rigid construction, i.e. the lower part 2 connected to the plate 1 behaves essentially as a granite block (FIG. 2).

The plate 1 is mounted on the lower part 2. For this purpose, use is made of a threaded sleeve 18 which is anchored in the part consisting of granite and of a screw 19 which is screwed into the threaded sleeve (FIG. 3).

The working table 3 is installed at a fixed location on the plate, and indeed screwed or adhesively bonded. The tool support 4 is formed as a freestanding column. The column is provided with a bearing arrangement 21 and is in engagement with a feed device 22, in order to displace the tool support 4 in the X-axis. The bearing arrangement is a gas bearing which includes three bearing elements 23, 24, 25, which are secured to the column. In the plate 1 there is formed a recess 26 in which the gas bearing is displaceably arranged. The gas bearing is held by means of holding members 27 in the recess 26 in such a way that the tool support is arranged for compulsory guidance on the plate 1. The feed device 22 is arranged in a fixed location in the recess 26. The feed device is a spindle drive (FIG. 4).

FIG. 5 shows a second embodiment of the apparatus which is a further development of the concept of the invention. The apparatus includes the plate 1, the lower part 2, the working table 3, the tool support 4 and an upper part 31. The upper part 31 extends over the length, or over a part of the length of the plate 1 and has a plate-like extension arm 32. The upper part 31 is screwed or adhesively bonded to the plate. A recess 33 which is made the same as or similar to the recess 26 in the plate 1 is formed in the extension arm 32. As FIG. 5 shows, the working table 3 can be secured to the extension arm at both sides. With this embodiment a particularly stiff apparatus is formed which is free of oscillation.

The tool support 4 is provided at its ends with a bearing arrangement 35 in each case. The bearing arrangement is a gas bearing or mechanical guide elements with bearing elements 24, 25 which are installed at the two ends of the tool carrier 4, so that the tool carrier 4 is compulsory guided.

The attachment positions in accordance with FIG. 3 are arranged in a grid in the plate 1. In this way the apparatus can be converted and/or enlarged in advantageous manner in such a way that a further working table and/or tool support are provided, with the working table and/or the tool support being arranged in a fixed location or being displaceably arranged. The displacement can take place simultaneously or individually in the same direction or in opposite directions. A hydraulic bearing, guide rails of steel or mechanical guide elements can be used as the bearing arrangement. Instead of the spindle transmission, a linear drive can be used as a direct drive.

I claim:

1. An apparatus for machining of workpieces, comprising a lower part; a granite plate supported on the lower part; a working table supported on the plate; and a tool support for supporting machining means and supported on the plate, wherein the lower part, the working table, and the tool support are formed of one of natural stone and plastic material, and wherein the lower part consists of a base plate and geometrically arranged wall parts, and the geometrically arranged wall parts, forming together with the base plate a chamber for receiving service and control means.

2. An apparatus according to claim 1, wherein the granite plate is mounted directly on the lower part; wherein the working table is supported on the plate one of fixedly and displaceably; wherein the tool support is supported on the plate one of fixedly and displaceably; and wherein a bearing arrangement is provided on one of working table and the tool support.

3. An apparatus according to claim 1, further comprising an upper part arranged above the lower part and formed of a non-metallic material.

4. An apparatus according to claim 3, wherein the upper part is formed of natural stone.

5. An apparatus according to claim 3, wherein the upper part is mounted on the plate.

6. An apparatus according to claim 5, wherein the tool support is supported one of fixedly or displaceably by the upper part.

7. An apparatus according to claim 1, further comprising a feed device for displacing the tool support along the plate, the tool support being connected, at one of its opposite ends, with the feed device.

8. An apparatus according to claim 7, further comprising an upper part arranged above the plate, and another feed device for displacing the tool support and arranged in the upper part, the tool support being connected, at another of its opposite ends, with the another feed device.

* * * * *